May 17, 1932.  G. C. CHASE ET AL  1,858,321
CALCULATING MACHINE
Filed Aug. 28, 1931   8 Sheets-Sheet 1

INVENTORS
George C. Chase
Charles F. Schweitzer
BY Stuart Felder
ATTORNEY

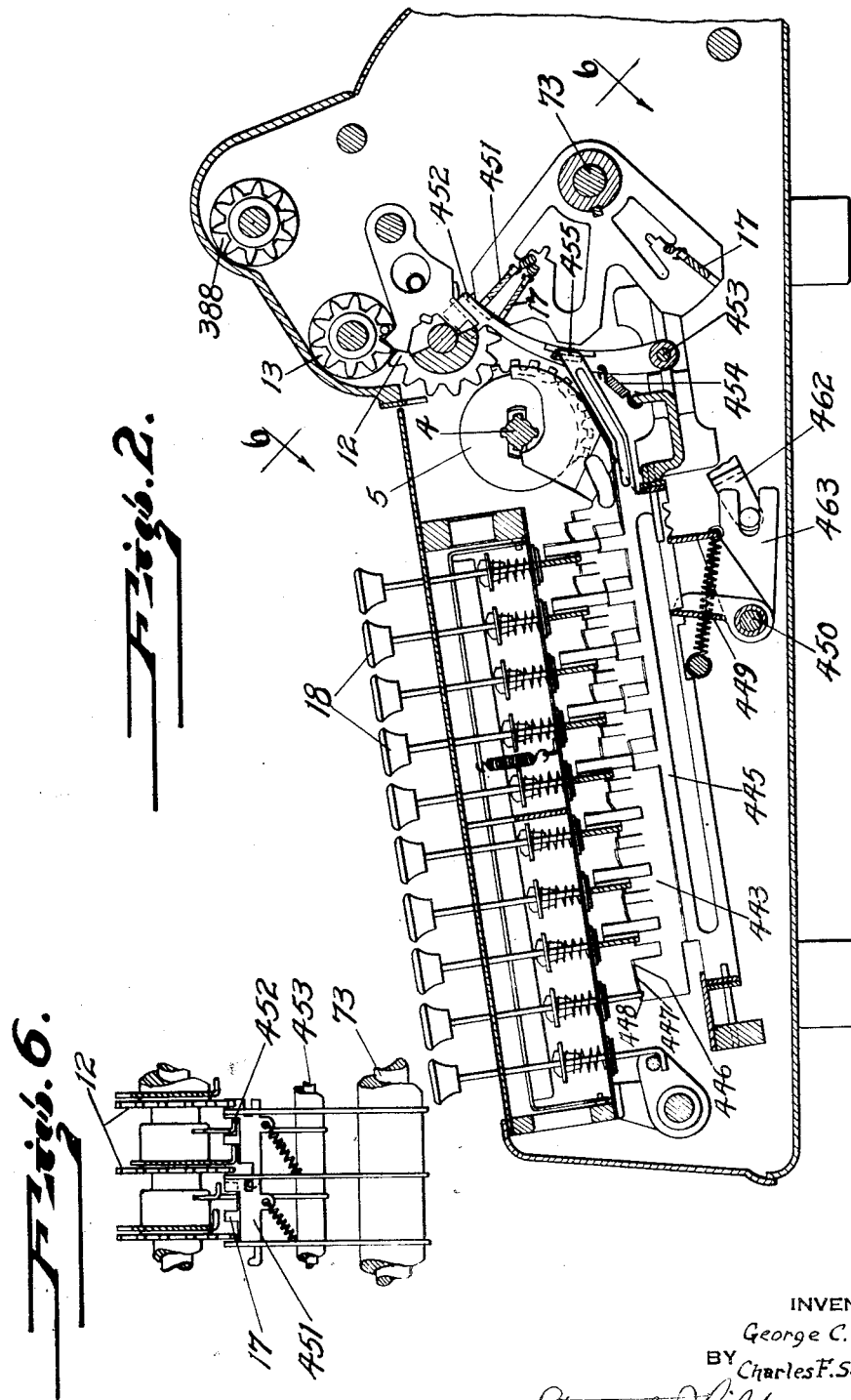

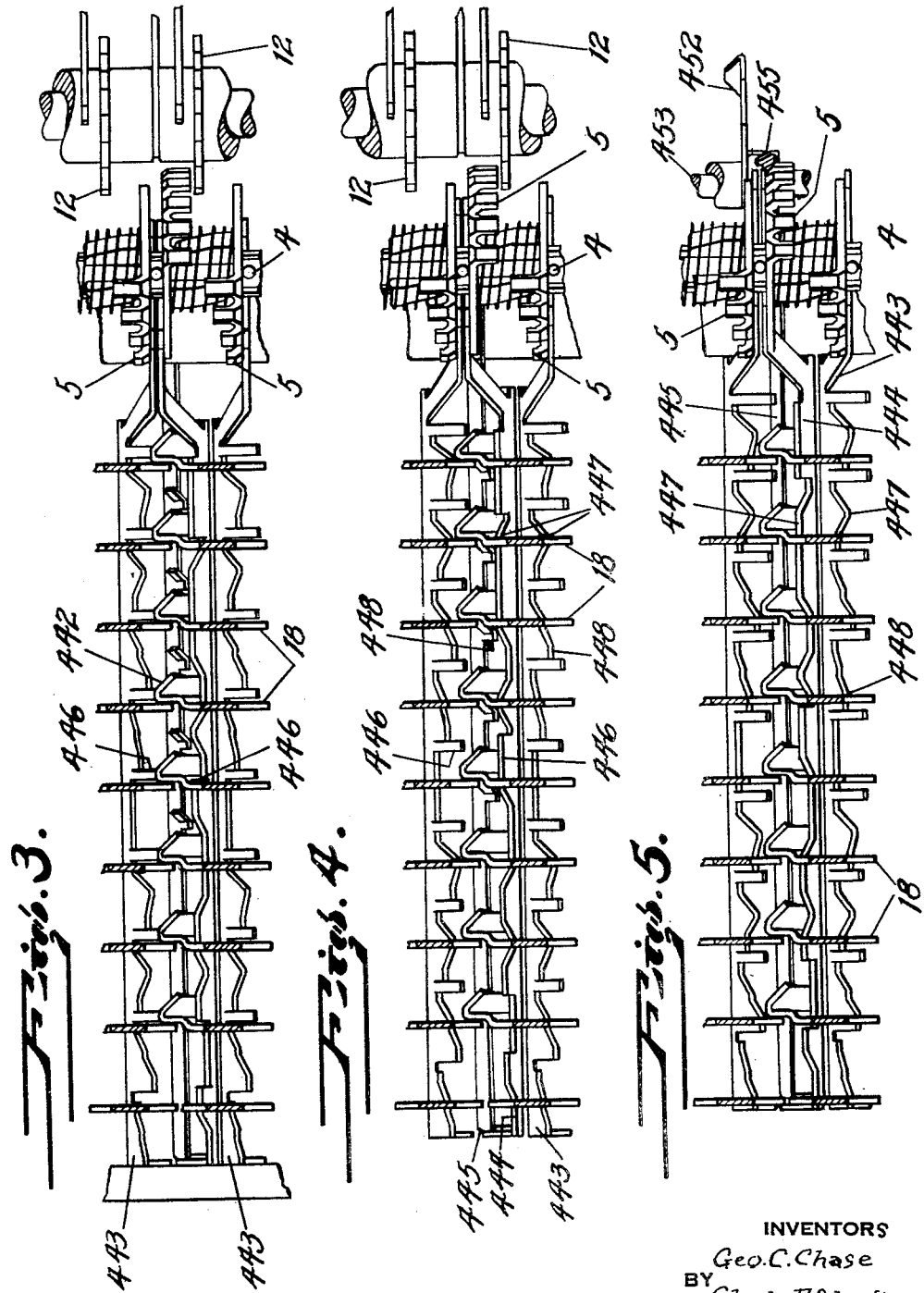

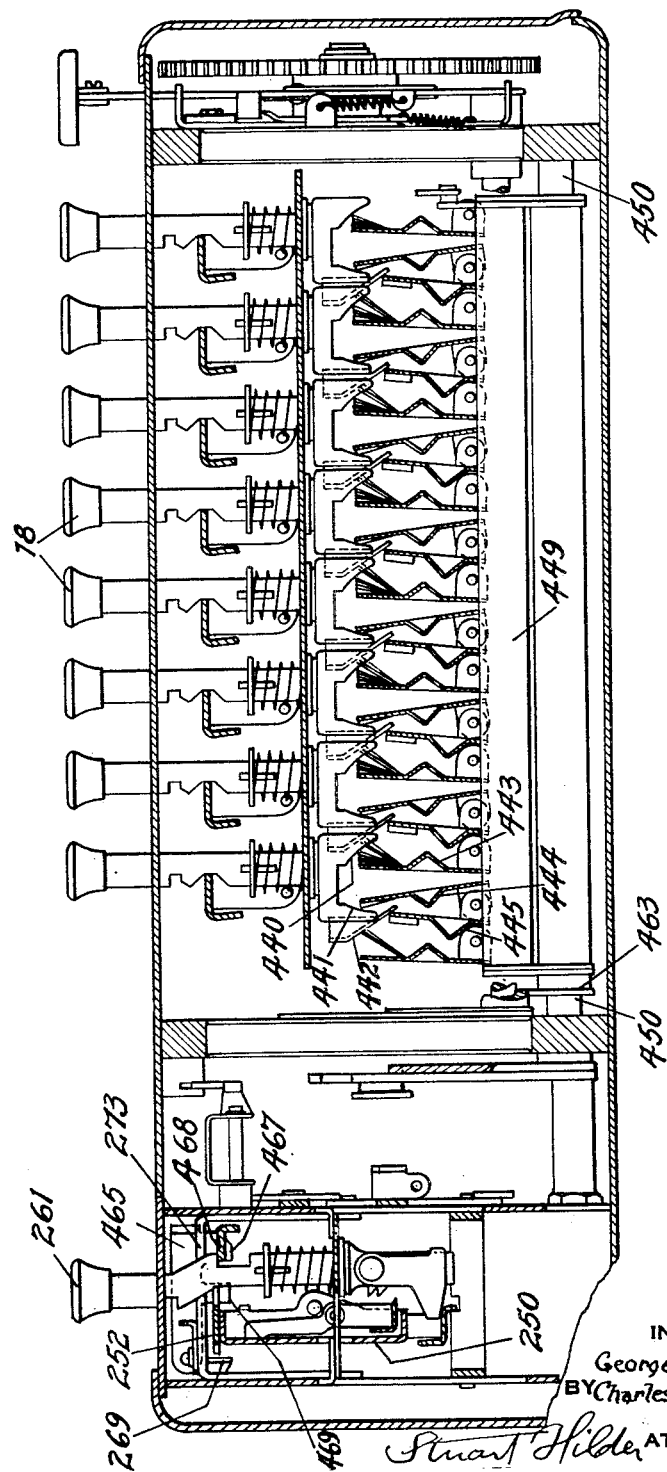

May 17, 1932.  G. C. CHASE ET AL  1,858,321
CALCULATING MACHINE
Filed Aug. 28, 1931   8 Sheets-Sheet 5
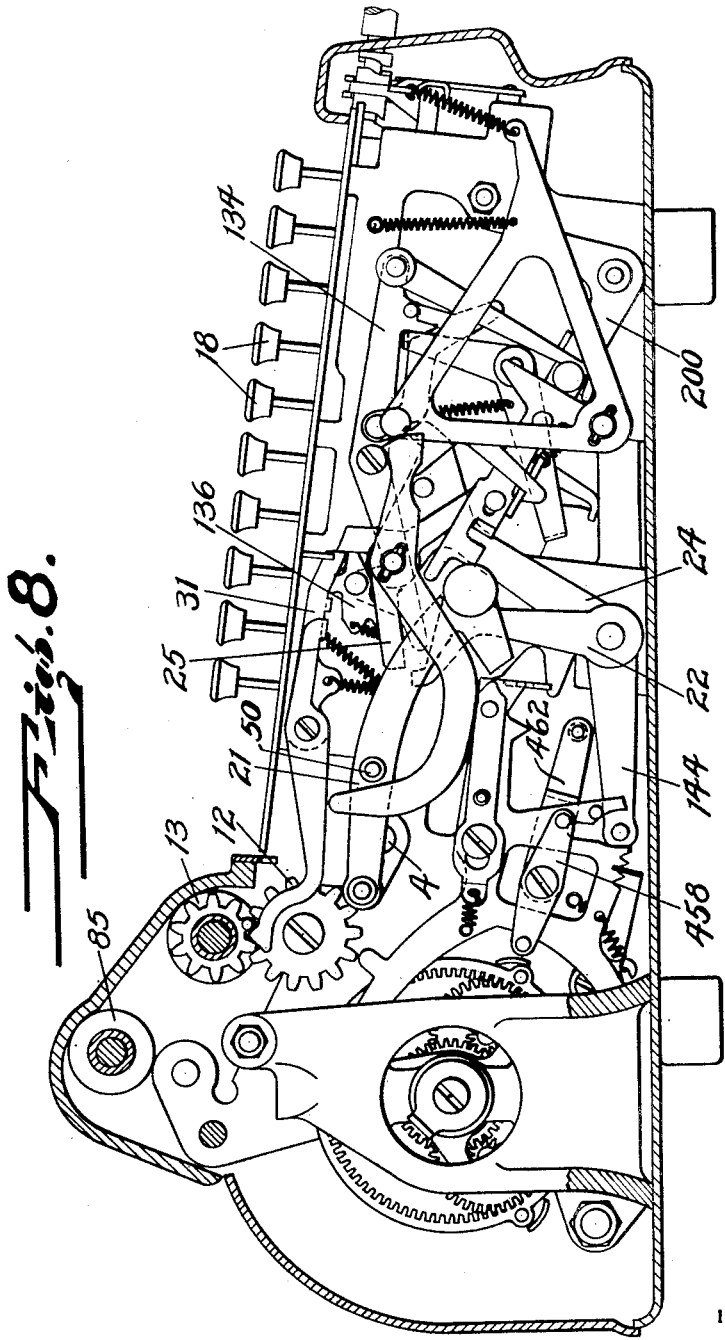
INVENTORS
George C. Chase
BY Charles F. Schweitzer
Stuart Hilder, ATTORNEY

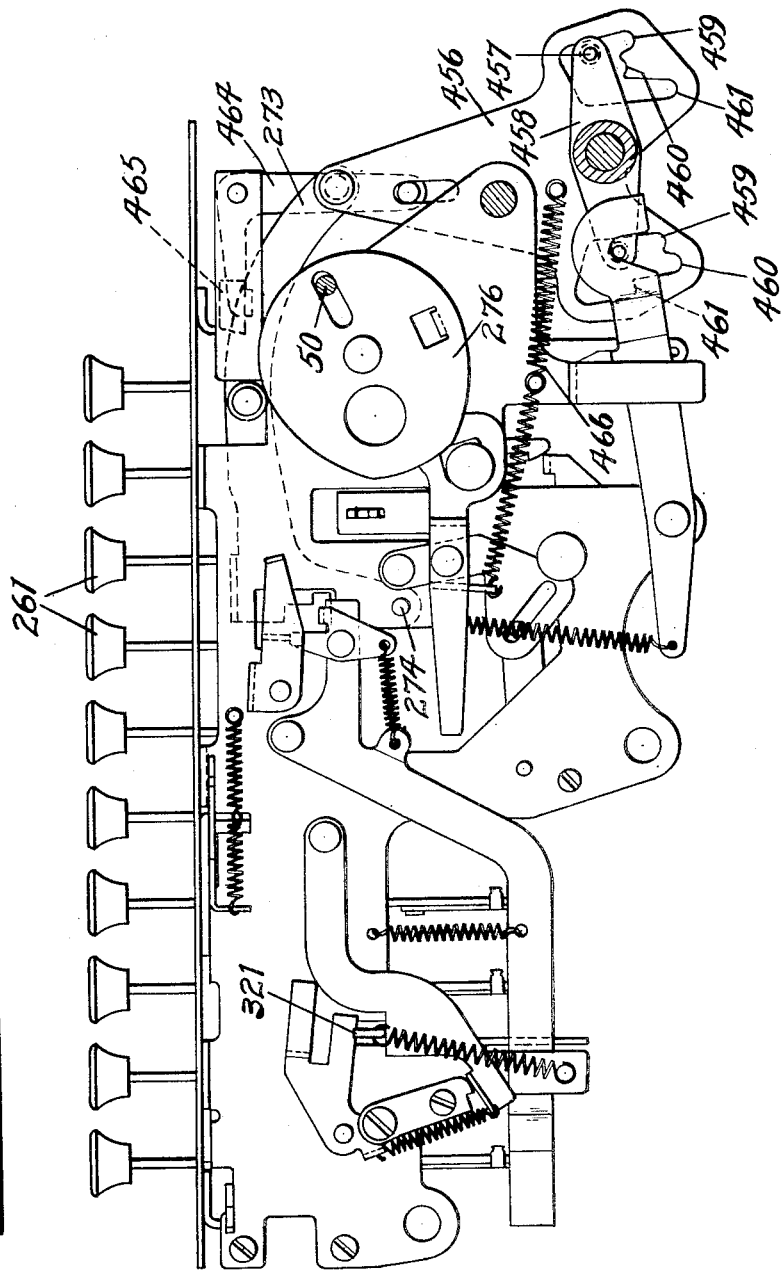

May 17, 1932.　　G. C. CHASE ET AL　　1,858,321
CALCULATING MACHINE
Filed Aug. 28, 1931　　8 Sheets-Sheet 7
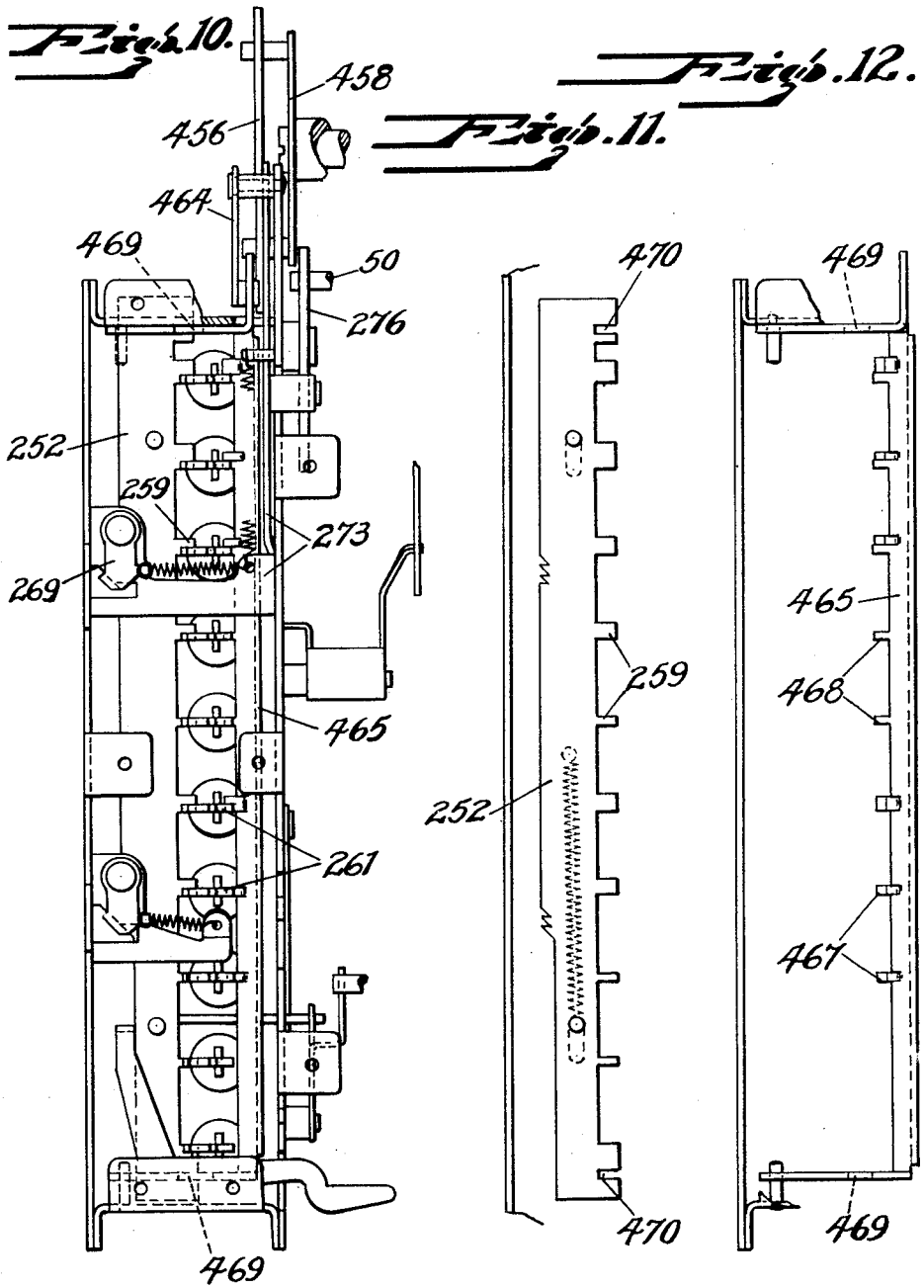
INVENTORS
George C. Chase
BY Charles F. Schweitzer
Stuart Wilder ATTORNEY May 17, 1932.  G. C. CHASE ET AL  1,858,321
CALCULATING MACHINE
Filed Aug. 28, 1931  8 Sheets-Sheet 8
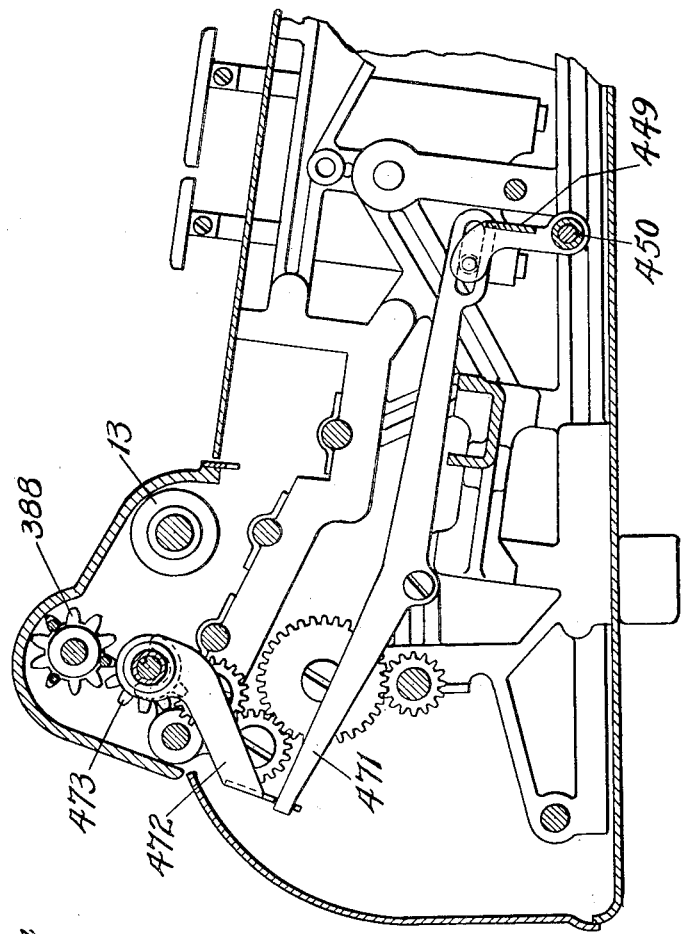
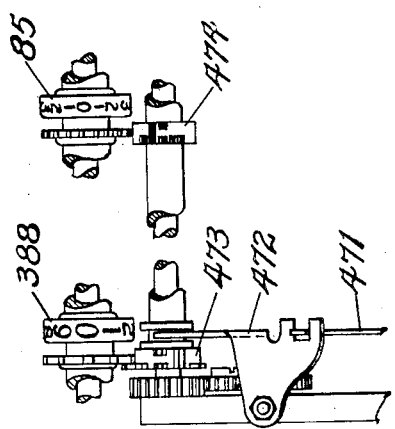
INVENTORS
George C. Chase
Charles F. Schweitzer
BY
Stuart Wilder
ATTORNEY Patented May 17, 1932

1,858,321

UNITED STATES PATENT OFFICE

GEORGE C. CHASE, OF SOUTH ORANGE, AND CHARLES F. SCHWEITZER, OF BLOOMFIELD, NEW JERSEY, ASSIGNORS TO MONROE CALCULATING MACHINE COMPANY, OF ORANGE, NEW JERSEY, A CORPORATION OF DELAWARE

CALCULATING MACHINE

Application filed August 28, 1931. Serial No. 559,834.

The invention has relation to calculating machines, and more particularly to means for performing multiplication.

U. S. Patent No. 1,842,584 shows a machine wherein the two well-known methods of multiplying machine operation, the repeated addition method and the partial product method, are combined to marked advantage, and the present application discloses means whereby the operation of such a combined machine will be rendered automatic.

The invention consists in the novel construction and combination of parts, as set forth in the appended claims.

In the accompanying drawings, illustrating the invention:

Fig. 2 is a section, taken on line 2—2 of Fig. 1.

Fig. 3 is a detail plan view of a group of selector bails, set to represent five times the key value.

Fig. 4 is a similar view, with the bails set to represent the true key value.

Fig. 5 is a similar view, with the bails set to represent twice the key value.

Fig. 6 is a detail plan view of the tens registering mechanism.

Fig. 7 is a section, taken on line 7—7 of Fig. 1.

Fig. 8 is a section, taken on line 8—8 of Fig. 1.

Fig. 9 is a right side elevation of the multiplier unit, looking approximately from the line of section 8—8.

Fig. 10 is a plan view of the multiplier unit, with top plate removed.

Fig. 11 is a detail plan view of the stop control slide.

Fig. 12 is a similar view of the actuator shift control slide.

Fig. 13 is a fragmentary section, taken on line 13—13 of Fig. 1.

Fig. 14 is a detail rear elevation of the multiplier registering mechanism.

Figure 1:
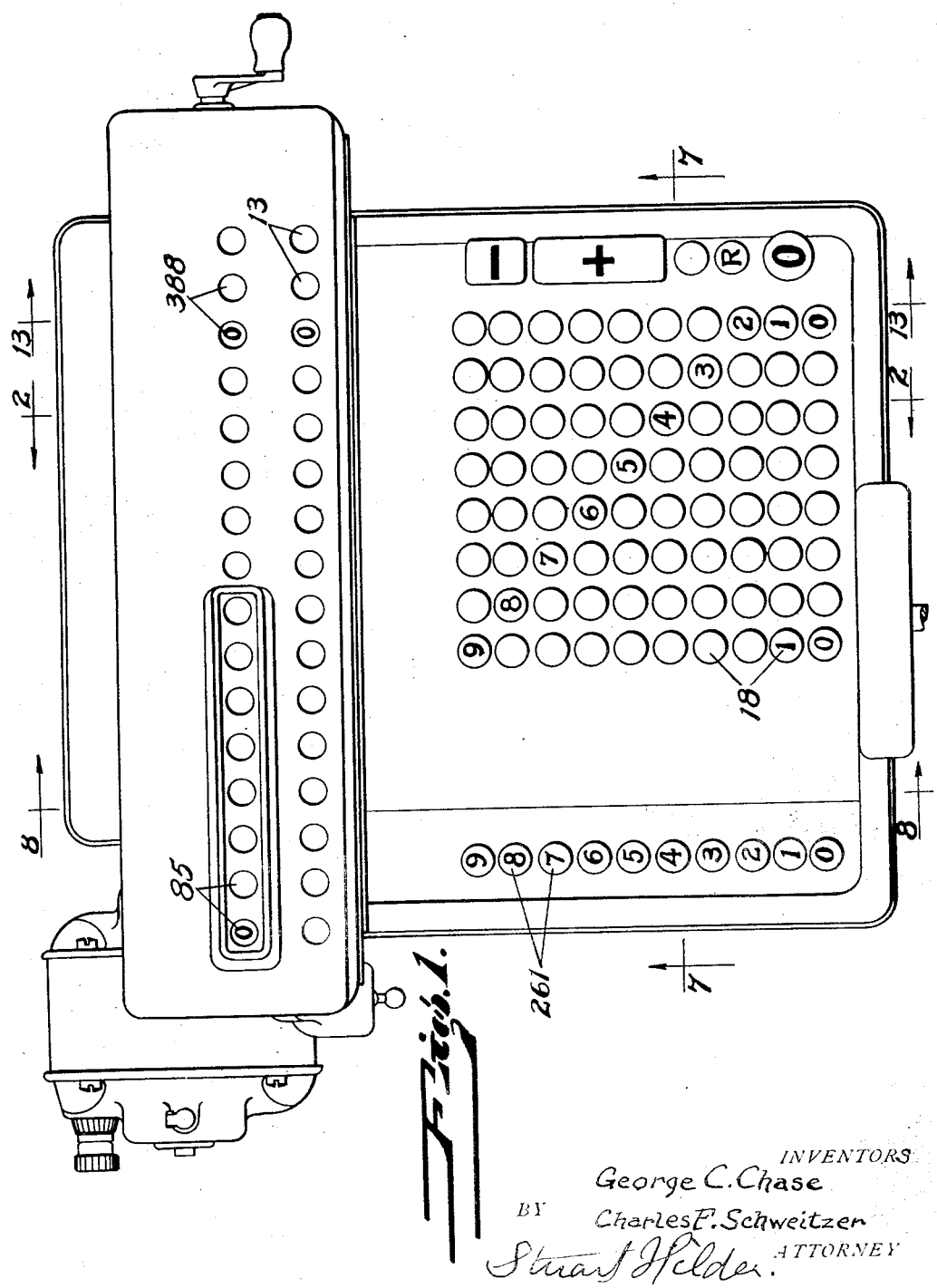
Fig. 1 is a plan view of a calculating machine embodying the invention.

In these drawings the invention is shown as applied to a Monroe type calculating machine, having motor operating means according to the disclosure of Patent No. 1,566,650, issued to Geo. C. Chase on December 22, 1925; multiplier key devices partly in accordance with the disclosure of Patent No. 1,685,074, issued to Geo. C. Chase on September 18, 1928, as modified in application Serial No. 213,570, filed August 17, 1927 by Hugo Enders; and five table mechanism according to the disclosure of application Serial No. 533,946, filed April 30, 1931 by Geo. C. Chase.

*One, two and five table mechanism*

Between the digit keys 18 of the multiplicand keyboard and the two part differential actuators 5 is located a selector mechanism whereby the amount set up on the keys, twice such amount, or five times such amount may be set in the actuators and transferred therefrom to the numeral wheels 13 upon each cycle of operation.

The use of selectors constructed in accordance with the multiplication tables for one, two and five gives an arrangement wherein the sum of the units and tens in any denominational order will never exceed nine, so that the mechanism may be of simple construction and the registration of the product may be made in a single cycle of operation, the units and tens being added by the selecting mechanism.

Each key is provided with three cam faces 440, 441 and 442 (Fig. 7), the cam faces of each column of keys overlying three corresponding selector bails 443, 444 and 445, of which bail 443 engages a differential actuator element 5 comprising four gear teeth of graded extent (Figs. 3, 4, and 5) ; bail 444 engages the cooperating actuator element, comprising five identical teeth, and bail 445 engages means for setting a supplemental one-tooth actuator, related to the numeral wheel of next higher denominational order. In addition to operating the bail 445, cam face 442 is adapted to operate the bail 443 related to the numeral wheel of next higher denominational order.

The bails 443, 444 and 445 are axially shiftable, to bring one or another of three series of lugs, 446, 447 and 448, into the planes of the cam faces of the keys, the lugs of bail 443 being offset transversely of the bails to varying degrees so that depression of a key may set this bail to bring one, two, three or four teeth of the actuator element into the plane of the related intermediate gear 12.

The lugs 446 are designed to give an actuator setting corresponding to five times the value of the key depressed, these lugs being represented in Fig. 3 as lying directly beneath the cam faces of the keys. Lugs 447, give a setting corresponding to the true value of the key depressed, and are shown in active position in Fig. 4. Lugs 448 give a setting of twice the key value, and are shown in active position in Fig. 5.

The bails 443, 444 and 445 are simultaneously adjusted from one of their three set positions to another by means of a cross plate 449, pivotally supported at 450 and engaging notches of the bails. The automatic adjustment of plate 449, to change the value of the key setting, will be described hereinafter.

The supplemental actuators 451 are similar in function to the elements of the two-part actuators 5, but are differently designed in order to permit a compact arrangement of the selector mechanism.

These actuators 451 (Figs. 2 and 6) comprise teeth slidably mounted in frames carried by the tens transfer shaft 73 and held normally in inactive position by suitable springs. Double-beveled cams 452 are pivotally adjustable about shaft 453 into the path of rotation of the actuators 451, against the tension of springs 454, these cams serving, when set to active position to move the related actuators into position to engage the intermediate gears 12, upon rotation of shaft 73.

The portions of the actuators 451 engaged by the cams 452 are offset from the planes of the tens transfer teeth 17, as shown in Fig. 6. Cams 452 are moved and held in active position by means of cam extensions 455 of the bails 445.

The action of the above described selector mechanism and the proper arrangement of lugs 446, 447 and 448 may best be explained by reference to an example, the various actuator settings obtainable from a key setting of 77 being chosen for this purpose.

With the bails set in five table position, depression of a seven key will rock the related bail 444 to bring the five identical teeth of the left-hand actuator element 5 into the plane of the intermediate gears 12, and will rock the bail 443 of next higher order to bring three of the graded teeth of the higher order right-hand actuator element 5 into the plane of its intermediate gear. Considering the depressed key to represent units, 35, or five times seven, will be set up. Upon depression of the seven key in the tens column, the same setting of corresponding bails 443 and 444 will take place, and it will be observed that in the tens column, the left-hand actuator element 5 has five teeth, and the right-hand element has three teeth in the plane of the intermediate gear. One rotation of shaft 4 will therefore register 385 on the numeral wheels 13.

Now, leaving the same keys depressed, the bails will be shifted to two table position, whereupon the setting upon bails 444 will be released, and the bails 443 will be released by the keys of next lower order and will be set by the keys of their own order to bring four teeth of the right-hand actuator element 5 to registering position. Also, the bails 445 of next higher order will be rocked to provide for setting of their single tooth supplemental actuators 451. Thus each key has set up 14 and, since an actuator 5 and an actuator 451 is set in the tens column, rotation of the shafts 4 and 73 will result in a registration of 154 on wheels 13.

Now, shifting the bails to their one table position, bails 445 will be released, and the bails 443 and 444 of the denominational order of each key will be set to bring two teeth and five teeth, respectively, into registering position, so that, upon rotation of shaft 4, 77 will be transferred to the wheels 13.

The operations above described, taken singly, therefore give us $77 \times 5 = 385$; $77 \times 2 = 154$, and $77 \times 1 = 77$. Now if the first two operations were performed successively, with the numeral wheels 13 in the same position relative to the actuators, the two partial products would be added, giving 539, the product of $77 \times 7$. Now, adding the third operation, we have a registration of 616, the product of $77 \times 8$. By similar combinations multiplication by any of the digits, from 1 to 9 will be provided for.

Determining the number of cycles of operation

Multiplier keys 261 are adapted to engage the graded teeth of a slide 252, (Figs. 7, 10 and 11) mounted upon a bail 250 and by rocking said bail, to interlock the depressed key 261 with the tooth of slide 252, so that the key is held depressed and bail 250 is held out of its normal position. When rocked by a key 261 an arm 321 of bail 250 will operate a releasing lever 134 having a link connection with a lever 200, normally serving to lock the product register actuators of the machine against moving (Figs. 7 and 8). Rocking of bail 250 by the multiplier key will also engage a clutch between the product register actuators mounted upon actuator shaft 4 and an electric motor, to initiate the registration of the product. This clutch engaging mechanism may be of any well known form and is not illustrated in the accompanying drawings. Forms of such clutch engaging mechanism are disclosed in U. S. Patent #1,685,074, and in application Serial No. 213,570 hereinbefore referred to.

At each cycle of operation of the actuating mechanism slide 252 will be moved forwardly, step by step, by means of a cam 276 (Fig. 9) driven by crank pin 50 in link 21, reciprocating arm 273 and pawl 269 (Fig. 10). Thus, the teeth of the slide are disengaged from the key 261, whereupon bail 250 will be restored to normal position by a suitable spring, and arm 321 of the bail will allow lever 134 to resume its normal position, bringing a releasing pawl 136 into engagement with trigger 31 to release an actuator stopping pawl 25 (Fig. 8). Pawl 25, which is mounted on a rock arm 24, will now drop into engagement with a shoulder of rock arm 22, having link connection 21 with shaft 4. Thus arm 24, being connected to the driven mechanism of the machine, will be carried forwardly against a fixed stop, to limit the movement of the actuators, an extension 144 of arm 24 acting to release the main clutch, as disclosed in Patent 1,566,650. Upon rebound of the parts, lock lever 200 will drop in front of link 21, to locate the actuators in full cycle position.

*Automatic changing of the selector setting*

The adjustment of the bails 443, 444 and 445 to a given one of their three shifted positions is governed by a plate 456 (Fig. 9), pivoted upon the end of the reciprocating arm 273 and provided with two stepped abutment portions adapted, as arm 273 (pivoted at 274) is raised by cam 276, to engage pins 457 in the opposite arms of an intermediately pivoted member 458. The stepped portions comprise each three seats, 459, acting to adjust the bails to one table position; 460, giving a two table adjustment, and 461, giving a five table adjustment. Pivoted member 458 has a sleeve extension, upon which is mounted an arm 462 (Figs. 2 and 8) having pin and slot connection with an arm 463, connected by a sleeve with the adjusting plate 449.

The engagement of pins 457 with one or another of the seats 459, 460, 461, and consequently the adjustment of bails 443, 444 and 445, is controlled by a bell-crank lever 464, one arm of said lever having pin and slot connection with plate 456 and the other arm engaging the rear extension of a bail 465, which serves to hold plate 456 in position, against the tension of spring 466.

Bail 465 lies normally in one table position, but may be depressed, by contact of a shoulder of the depressed multiplier key 261 (Fig. 7) with a lug 467 of the bail into two table position, wherein the step 460 will be guided into contact with the pins 457. Bail 465 may be still further depressed, into five table position, by contact of the key with a more elevated lug 468 of said bail.

In order to set the bails 443, 444 and 445 successively into the different adjusted positions necessary to multiplication by the desired digit, bail 465 is provided with pin 469, engaging slots 470 of slide 252, so that bail 465 will be moved axially, as slide 252 is advanced.

It will be evident therefore, that the number of cycles of operation will be determined by the lateral extent of the teeth 259 of slide 252 contacted by the depressed key, while the adjustment of the selector bails during any given cycle will be governed by the relation of bail 465 to said key, as determined by the lugs 467 and 468. The teeth of slide 252, and the lugs of bail 465 are therefore related to the different keys 261 as follows (Figs. 10, 11, and 12).

Tooth 259 cooperating with the 1 key is of single step width, providing for a single cycle of operation, and there is no lug upon bail 465 related to said key, so that the one table or true key value is set in the selectors.

The 2 key cooperates with a one step tooth 259 and with a lug 467, giving one cycle of two table registration.

The 3 key has a two step tooth 259 and a lug 467 opposite the first step of said tooth. Therefore, the first cycle will be a two table registration, and the second cycle a one table registration.

The 4 key has a two step tooth 259 and a two step lug 467, giving two cycles of two table registration.

The 5 key has a one step tooth 259 and a lug 468, giving one cycle of five table registration.

The 6 key has a two step tooth 259 and a lug 468 opposite the first step only.

The 7 key has a two step tooth 259, a lug 468 and a lug 467.

The 8 key has a three step tooth 259, a lug 468 opposite the first step and a lug 467 opposite the second step.

The 9 key has a three step tooth 259, a lug 468 and a two step lug 467.

*Multiplier registers*

The machine herein illustrated is provided with two sets of numeral wheels 85 and 388, both of which will register the multiplier, figure by figure, as the partial products are registered. In order to make these wheels show a correct multiplier registration, in any adjustment of the selectors, the following mechanism is provided:

One of the arms carrying adjusting plate 449 has pin and slot engagement with an intermediately fulcrumed lever 471 engaging at its rear end within the slot of a pivoted shipper plate 472. Plate 472 engages a collar of a drum 473, provided with three rows of mutilated gear teeth. The arrangement is such that when the selectors have a one table setting, drum 473 will have a single tooth in the plane of the gear attached to the wheel 388 to be advanced; when the selectors have a two table setting, a two toothed portion of drum 473 will lie in registering position, and when the selectors have a five table setting, five teeth of the drum are set to register.

Drum 473 is connected by a sleeve with a similar drum 474, cooperating with the gear of a wheel 85, so that one, two or five will be registered upon said wheels, in correspondence with the registration upon wheels 388.

We claim:

1. In a calculating machine having digit keys, selector mechanism settable selectively to represent an amount set up on said keys or a multiple of such amount, and actuators controlled by said mechanism; key controlled multiplier mechanism including means operable automatically to shift said selector mechanism from one set position to another, and means operable automatically to selectively determine the number of cycles of operation of said actuators.

2. In a calculating machine having digit keys, selector mechanism settable selectively to represent an amount set up on said keys or a multiple of such amount, and actuators controlled by said mechanism; key controlled multiplier mechanism including means operable to shift said selector mechanism from one set position to another, means operable to stop effective movement of said actuators, and means including a progressively advanced member for coordinating the action of the shifting and the stopping means.

3. In a calculating machine having digit keys, selector mechanism settable selectively to represent an amount set up on said keys or a multiple of such amount, and actuators controlled by said mechanism; means operable to shift said selector mechanism from one set position to another, means operable to stop effective movement of said actuators, a progressively advanced member controlling the sifting mechanism, a progressively advanced member controlling the stopping mechanism, and depressible keys engaging said progressively advanced members.

4. In a calculating machine having digit keys, selector mechanism settable selectively to represent an amount set upon said keys or a multiple of such amount, and actuators controlled by said mechanism; means operable to shift said selector mechanism from one set position to another, and control means operable automatically to repeatedly actuate the shifting means.

5. In a calculating machine having digit keys, selector mechanism settable selectively to represent an amount set upon said keys or a multiple of such amount, and actuators controlled by said mechanism; means including two periodically engaged members for differentially controlling the set position of said selector mechanism, and means operable automatically to repeatedly adjust one of said periodically engaged members.

6. In a calculating machine having digit keys, selector mechanism settable selectively to represent an amount set upon said keys or a multiple of such amount, and actuators controlled by said mechanism; means for differentially controlling the set position of said selector mechanism, including an intermediately pivoted member, a plate having two stepped portions, and means for periodically engaging the stepped portions of said plate with opposite arms of said intermediately pivoted member, and means operable automatically to repeatedly adjust said plate.

7. In a calculating machine having digit keys, selector mechanism settable selectively by said keys, ordinal actuators controlled by said mechanism, and driving means including a shaft; supplementary actuators cooperating each with an ordinal actuator, normally inactive means for setting said supplementary actuators upon rotation of the drive shaft, and devices operated each by the keys of lower order for rendering the setting means active upon the higher order supplementary actuator.

GEORGE C. CHASE.
CHARLES F. SCHWEITZER.